US012612932B2

(12) United States Patent
Asada et al.

(10) Patent No.: US 12,612,932 B2
(45) Date of Patent: Apr. 28, 2026

(54) ROTARY ACTUATOR

(71) Applicant: NABTESCO CORPORATION, Tokyo (JP)

(72) Inventors: Satoshi Asada, Tokyo (JP); Richard Eiji Durkee, Tokyo (JP); Naofumi Miwa, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 18/913,113

(22) Filed: Oct. 11, 2024

(65) Prior Publication Data

US 2025/0137472 A1 May 1, 2025

(30) Foreign Application Priority Data

Oct. 31, 2023 (JP) ................................ 2023-187078

(51) Int. Cl.
*F15B 15/12* (2006.01)
*F15B 15/06* (2006.01)

(52) U.S. Cl.
CPC ............ *F15B 15/125* (2013.01); *F15B 15/06* (2013.01)

(58) Field of Classification Search
CPC ............................... F15B 15/06; F15B 15/125
See application file for complete search history.

(56) References Cited

U.S. PATENT DOCUMENTS 2,649,077 A * 8/1953 Mehm .................. F15B 15/125 91/196
3,188,919 A * 6/1965 Sills ...................... F15B 15/125 92/120
4,628,797 A * 12/1986 Kendall ................. F01C 9/002 92/255
5,235,900 A * 8/1993 Garceau ................ F15B 15/125 92/123

(Continued)

FOREIGN PATENT DOCUMENTS

CA 2057486 A1 6/1992
DE 19825915 A1 9/1999

(Continued)

OTHER PUBLICATIONS

Extended European Search Report dated Feb. 17, 2025, issued in corresponding European Patent Application No. 24207536.4 (12 pgs.).

*Primary Examiner* — Thomas E Lazo
(74) *Attorney, Agent, or Firm* — Pillsbury Winthrop Shaw Pittman, LLP

(57) ABSTRACT

A rotary actuator includes: an output shaft; a housing in which a cylinder is defined, the cylinder having a circular arc shape around the output shaft; a piston adapted to move inside the cylinder by action of a pressure medium; and an arm connecting the piston and the output shaft. When viewed in plan from a direction parallel to the output shaft, a top surface of the piston has three equally divided regions divided in the radial direction from the center of the output shaft, the middle one of the three regions is a central region.

(Continued)

When viewed in plan from the direction parallel to the output shaft, a connection point between the piston and the arm is situated on a virtual line that is orthogonal to the top surface and passes through the central region.

6 Claims, 2 Drawing Sheets

(56) References Cited

U.S. PATENT DOCUMENTS

| | | | | |
|---|---|---|---|---|
| 5,330,333 | A * | 7/1994 | Holmes | F15B 15/125<br>418/35 |
| 9,593,696 | B2 | 3/2017 | Kim et al. | |
| 2014/0238226 | A1 | 8/2014 | Kim et al. | |
| 2014/0238227 | A1 | 8/2014 | Kim et al. | |
| 2014/0238228 | A1 | 8/2014 | Sobolewski et al. | |
| 2014/0238229 | A1 | 8/2014 | Sobolewski et al. | |
| 2014/0238230 | A1 | 8/2014 | Kim et al. | |
| 2015/0000515 | A1 | 1/2015 | Sobolewski et al. | |

FOREIGN PATENT DOCUMENTS

| | | | |
|---|---|---|---|
| EP | 0181971 | A1 | 5/1986 |
| FR | 2253159 | A1 | 6/1975 |
| WO | 2014/133871 | A1 | 9/2014 |
| WO | 2014/133884 | A1 | 9/2014 |
| WO | 2014/133939 | A2 | 9/2014 |
| WO | 2014/204799 | A1 | 12/2014 |
| WO | 2015/116919 | A1 | 8/2015 |
| WO | 2015/116992 | A2 | 8/2015 |
| WO | 2016/043799 | A1 | 3/2016 |

* cited by examiner

ROTARY ACTUATOR

CROSS-REFERENCE TO RELATED APPLICATIONS

This application is based on and claims the benefit of priority from Japanese Patent Application Serial No. 2023-187078 (filed on Oct. 31, 2023), the contents of which are hereby incorporated by reference in its entirety.

TECHNICAL FIELD

The present disclosure relates to a rotary actuator.

BACKGROUND

A rotary actuator disclosed in U.S. Pat. No. 9,593,696 ("the '696 Patent") includes an output shaft, a housing, an assembly, a piston, and an arm. The housing is hollowed. The output shaft penetrates the housing. The assembly is disposed inside the housing. The assembly has an arc shape centered with the output shaft. A cylinder serving as a channel of a pressure medium is defined in the assembly. The assembly is formed in an arc shape corresponding to the profile of the assembly. One end of the cylinder in a circumferential direction is closed. The other end of the cylinder in the circumferential direction is opened inside the housing. The piston is connected to the output shaft via the arm. The piston extends in an arc shape in the circumferential direction from the portion connected to the arm. A portion of the arm away from the portion connected to the arm is disposed in the cylinder through the opening of the cylinder. The piston can reciprocate in the cylinder.

The pressure medium is supplied into the housing at two points, which are outside and inside of the cylinder. When the pressure medium is supplied inside the cylinder, a force pushing the piston away from the cylinder acts on a first end of the cylinder, which is the end opposite to the connected portion of the piston. Whereas when the pressure medium is supplied outside the cylinder, a force pushing the piston into the cylinder acts on a second end of the cylinder, which is the end on the connected portion side of the piston. By changing the strength of these two forces, the piston reciprocates in the cylinder.

In the rotary actuator of the '696 Patent, a force of the pressure medium acts on the first end of the piston. The direction of the force acting on the first end is along a tangent line of a virtual circle passing through the first end and centered on the output shaft. Therefore, part of the force from the pressure medium acts as a force that pushes the piston radially outward. Therefore, a structure that can efficiently transmit the force of the pressure medium as a force to rotate the arm and output shaft is desired.

SUMMARY

According to one aspect of the disclosure, a rotary actuator includes: an output shaft; a housing in which a cylinder is defined, the cylinder having a circular arc shape around the output shaft; a piston adapted to move inside the cylinder by action of a pressure medium; and an arm connecting the piston and the output shaft. When viewed in plan from a direction parallel to the output shaft, a top surface of the piston has three equally divided regions divided in the radial direction from the center of the output shaft, the middle one of the three regions is a central region. When viewed in plan from the direction parallel to the output shaft, a connection point between the piston and the arm is situated on a virtual line that is orthogonal to the top surface and passes through the central region.

In the above configuration, the connection point is disposed on the extension of the central region of the top surface of the piston. Therefore, it is possible to minimize a difference between the direction of the force acting on the top surface of the piston and the direction in which the arm and the output shaft rotate. Thus, when the force of the pressure medium acts on the top surface, it is possible to reduce the force that pushes the piston radially outward. As a result, when the force of the pressure medium acts on the top surface, the force can be efficiently transmitted as a force to rotate the arm and output shaft.

When viewed in plan from the direction parallel to the output shaft, the virtual line may pass through the center of the top surface in the radial direction.

The cylinder is one of a plurality of the cylinders arranged spaced apart from each other in a circumferential direction around the output shaft. The arm may include: a first portion extending between two adjacent cylinders of the plurality of cylinders in the radial direction; and a second portion extending from said first portion in the circumferential direction and connected to the piston.

The top surface may be circular when viewed in plan from a direction orthogonal to the top surface.

Advantageous Effect

According to the above aspects, it is possible to efficiently transmit the force of the pressure medium acting on the top surface of the piston to the arm and output shaft.

DESCRIPTION OF THE EMBODIMENTS

<Overall Configuration>

An embodiment of an actuator system applied to an aircraft will be hereunder described with reference to the accompanying drawings. An actuator system hereinafter described is used as, for example, a system for operating a flight control surface of an aircraft.

Figure 1:
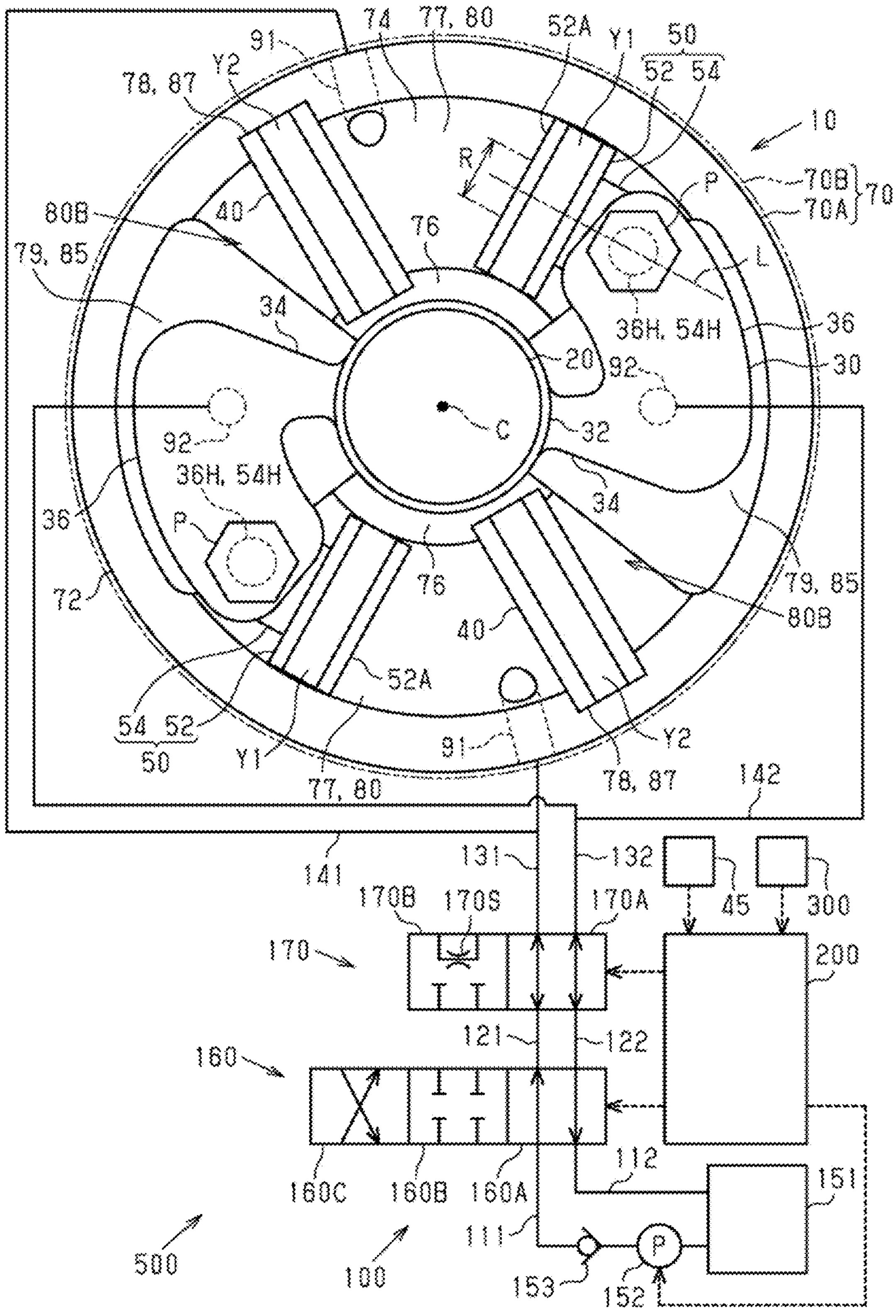
FIG. 1 is a plan view of a rotary actuator.

As shown in FIG. 1, an actuator system 500 includes a rotary actuator 10. The rotary actuator 10 includes an integrated housing 70, an output shaft 20, an arm 30, two pistons 50, and two sealing members 40.

<Integrated Housing>

Figure 2:
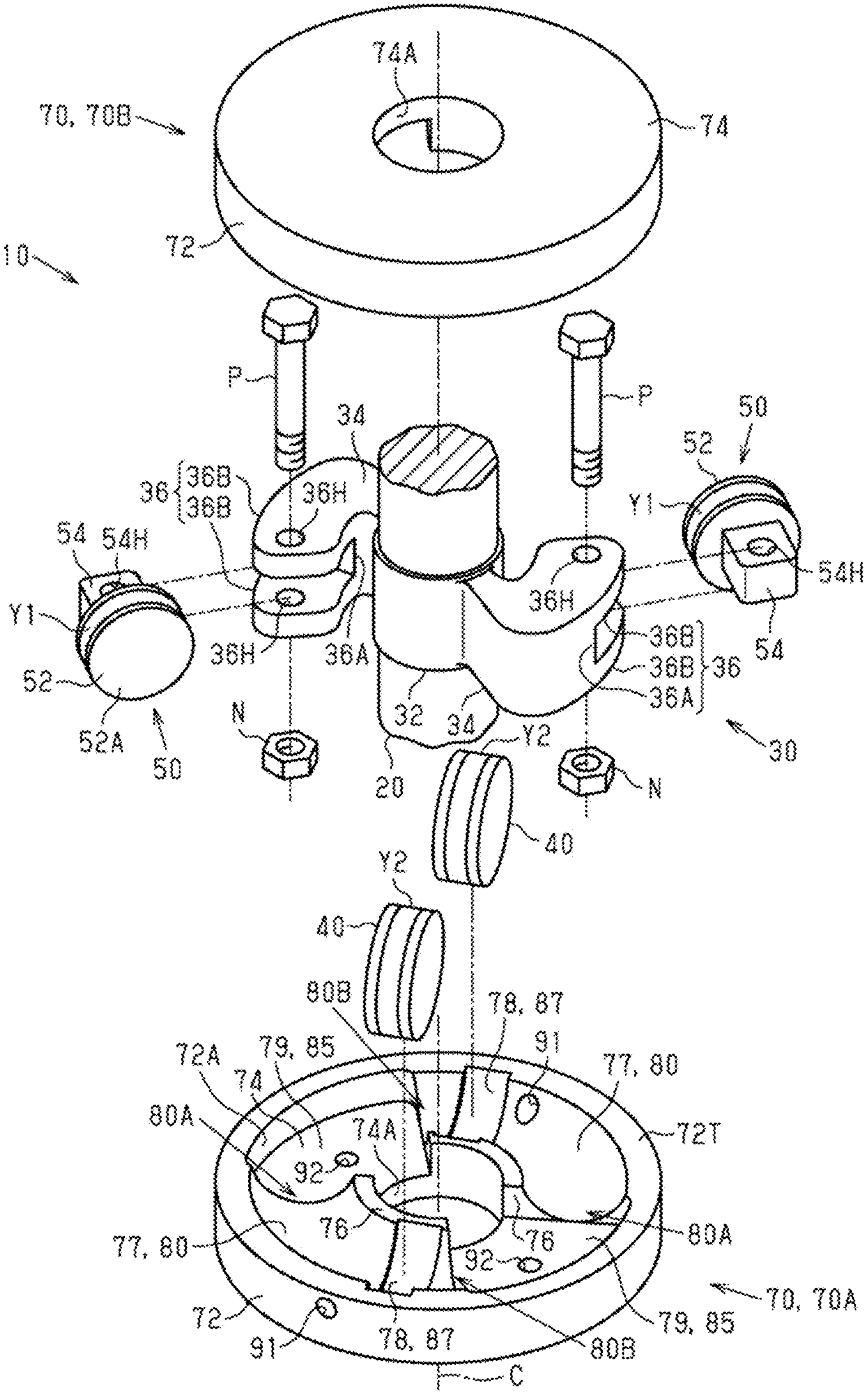
FIG. 2 is an exploded perspective view of the rotary actuator.

As shown in FIGS. 1 and 2, the integrated housing 70 includes a first housing 70A and a second housing 70B. Note that the outer profile of the second housing 70B is shown in the chain double-dashed line in FIG. 1. In FIG. 1, the profile of the second housing 70B is drawn larger than that of the first housing 70A for convenience, but in practice the first housing 70A and the second housing 70B are the same size.

The first housing 70A and the second housing 70B have the same basic configuration. The configuration of the first housing 70A is described below. As shown in FIG. 2, the first housing 70A has a peripheral wall 72 and a bottom wall 74. The peripheral wall 72 has an annular shape. The bottom wall 74 has a disc shape. The bottom wall 74 closes one end of the peripheral wall 72 extending in the direction along a central axis C of the peripheral wall 72. Hereinafter, the direction along the central axis C of the peripheral wall 72 is simply referred to as the axial direction. Similarly, the radial direction from the central axis C of the peripheral wall 72 is simply referred to as the radial direction. Also, the circumferential direction around the central axis C of the peripheral wall 72 is simply referred to as the circumferential direction.

The bottom wall 74 has a central hole 74A. The central hole 74A penetrates the bottom wall 74. The central axis C of the central hole 74A coincides with the central axis C of the peripheral wall 72. Axes that are coaxial with the central axis C of the peripheral wall 72 are herein all marked with "C".

The first housing 70A has two groove walls 76. The two groove walls 76 have the same configuration. One of the two groove walls 76 will be described below in details. The groove wall 76 protrudes from the bottom wall 74 into an interior space enclosed by the peripheral wall 72. The groove wall 76 extends to the same level as an end surface 72T of the peripheral wall 24 opposite the bottom wall 74. The groove wall 76 extends in a circular arc over 90 degrees around the central axis C of the peripheral wall 72. In the radial direction, the groove wall 76 extends from the inner surface of the central hole 74A to an inner circumferential surface 72A of the peripheral wall 72. A radially outer portion of the groove wall 76 is continuous with the peripheral wall 72.

The groove wall 76 has an arcuate groove 77. The arcuate groove 77 is recessed toward the bottom wall 74. In the circumferential direction, the arcuate groove 77 extends along the profile of the groove wall 76. That is, the arcuate groove 77 extends in a circular arc over 90 degrees around the central axis C of the peripheral wall 72. In the circumferential direction, the arcuate groove 77 reaches both ends of the groove wall 76.

A sectional view of the groove wall 76 cut along the central axis C of the peripheral wall 72 is referred to as a specified sectional view. In the specified sectional view, the shape of the wall surface defining the arcuate groove 77 is a semicircle. The shape of the wall surface and the diameter of the semicircle defining the arcuate groove 77 are the same over both ends of the groove wall 76 in the circumferential direction.

The groove wall 76 has a deep groove 78. The deep groove 78 is situated near one of the two ends of the groove wall 76 in the circumferential direction. In the specified sectional view, the shape of the wall surface defining the deep groove 78 is a semicircle. The diameter of the semicircle of the deep groove 78 is slightly larger than the diameter of the semicircle of the arcuate groove 77. Of the ends of the groove walls 76 and thus of the arcuate groove 77 in the circumferential direction, the end closer to the deep groove 78 is referred to as a closed end 80B, and the end opposite the closed end 80B is referred to as an open end 80A.

A planar view of the first housing 70A facing parallel to the central axis C of the peripheral wall 72 is referred to as a specified plan view. In the specified plan view, the two groove walls 76 are in a two-fold symmetrical relationship about the central axis line C. Accordingly, the two arcuate grooves 77 and consequently the two deep grooves 78 are also in a two-fold symmetrical relationship about the central axis line C in the specified plan view. And there is a gap in the circumferential direction between the two arcuate grooves 77. An intermediate chamber 79 is defined by the inner circumferential surface 72A of the peripheral wall 72 and the bottom wall 74 between the two arcuate grooves 77. In other words, in the circumferential direction, the arcuate grooves 77 and the intermediate chambers 79 are alternately arranged. The central axis C of the peripheral wall 72 is also the central axis C of the first housing 70A and thus the integrated housing 70. Hereafter, plan views of the components of the rotary actuator 10, not limited to the first housing 70A, in a direction parallel to the central axis C of the peripheral wall 72 may be referred to as specified planar views.

The first housing 70A has two first feed and drain holes 91. Each arcuate groove 77 has the first feed and drain hole 91. The first feed and drain holes 91 open at the wall surface defining the arcuate groove 77 and at the outer circumferential surface of the peripheral wall 72. Of the two openings of the first feed and drain holes 91, the opening in the wall surface defining the arcuate groove 77 is situated near the deep groove 78. In the circumferential direction, this opening is situated on the open end 80A side of the deep groove 78 in the arcuate groove 77 in which the deep groove 78 is provided.

The first housing 70A has two second feed and drain holes 92. Each intermediate chamber 79 has the second feed and drain hole 92. The second feed and drain holes 92 are open on both sides of the bottom wall 74 that defines the intermediate chamber 79. The second feed and drain holes 92 are formed at the circumferential center of the intermediate chamber 79.

The first housing 70A is configured as described above. For convenience of explanation, the walls of the first housing 70A are distinguished as the peripheral wall 72, bottom wall 74, and groove wall 76. However, the peripheral wall 72, bottom wall 74, and groove wall 76 are integrally molded and there is no clear boundary between these walls in practice.

The configuration of the second housing 70B is basically the same as that of the first housing 70A. The second housing 70B is symmetrical in structure to the first housing 70A with respect to a virtual plane orthogonal to the central axis C. Therefore, suppose that the first housing 70A and the second housing 70B are placed side by side on the left and right, and each is viewed in the specified plane from the opposite side of the bottom wall 74 of the peripheral wall 72. In this case, the second housing 70B is symmetrical with the first housing 70A. Unlike the first housing 70A, the second housing 70B is not provided with the first and second feed and drain holes.

The first housing 70A and the second housing 70B are fixed such that their respective arcuate grooves 77 face each other and their respective intermediate chambers 79 face each other. When the first housing 70A and the second housing 70B are fixed, the end surfaces 72T of the peripheral walls 72 of the first and second housing 70A and 70B are in surface contact with each other. The surfaces of the first and second housing 70A and 70B, which are protruding ends of the groove walls 76, are in contact with each other.

As shown in FIGS. 1 and 2, inside the integrated housing 70, into which the first housing 70A and the second housing 70B are integrated, a cylinder 80 is defined by facing the arcuate grooves 77 of these two housings 70A and 70B. The cylinder 80 is a passage through which hydraulic oil flows. Reflecting the features of the arcuate grooves 77, the cylinder 80 has the following features. When the cylinder 80 is viewed in the specified section, the shape of the wall surfaces defining cylinder 80 is a circle. When the integrated housing 70 is viewed in the specified plan view, the cylinder 80 extends in a circular arc shape around the central axis C of the peripheral wall 72. The two cylinders 80 are provided spaced apart in the circumferential direction. A fluid chamber 85 is defined by the two intermediate chambers 79 of the housings 70A and 70B facing each other inside the integrated housing 70. Like the cylinders 80, two fluid chambers 85 are provided. In the circumferential direction, the cylinders 80 and the fluid chambers 85 are alternately arranged.

<Seal Member>

As shown in FIG. 1, near the closed end 80B of the cylinder 80, an annular groove 87 are defined by the deep grooves 78 of the first and second housings 70A and 70B facing each other. Corresponding to the number of deep grooves 78, two annular grooves 87 are provided. The sealing member 40 is individually fitted into each annular groove 87. As shown in FIG. 2, the sealing member 40 is disc-shaped. The diameter of the sealing member 40 is slightly smaller than the diameter of the annular groove 87. A seal ring Y2 is attached to the outer peripheral surface of the sealing member 40. The seal ring Y2 closes the gap between the wall surface defining the annular groove 87 and the outer circumferential surface of the sealing member 40.

<Output Shaft>

As shown in FIG. 2, the output shaft 20 has a rod shape. The output shaft 20 penetrates the integrated housing 70. The output shaft 20 extends into and out of the integrated housing 70 through the central hole 74A of the integrated housing 70. The diameter of the output shaft 20 is slightly smaller than the diameter of the central hole 74A. Although not shown in the drawings, the gap between the output shaft 20 and the inner surface of the central hole 74A is sealed by a seal ring. A portion of the output shaft 20 that is exposed to the outside of the integrated housing 70 is connected, for example, to a flight control surface of an aircraft. The central axis C of the output shaft 20 coincides with the central axis C of the first housing 70A and the second housing 70B. In other words, the axial, radial, and circumferential directions described in relation to the first housing 70A are also the axial, radial, and circumferential directions with reference to the output shaft 20, respectively.

<Arm>

As shown in FIG. 2, the arm 30 is disposed inside the integrated housing 70. The arm 30 includes a fixing portion 32, two first portions 34, and two second portions 36.

The fixing portion 32 has a cylindrical shape. The output shaft 20 is inserted into a central hole of the fixing portion 32. The center axis C of the fixing portion 32 coincides with the center axis C of the output shaft 20. The fixing portion 32 is fixed to the output shaft 20 by spline connection. In the axial direction, the fixing portion 32 is disposed at the same position with the groove wall 76. The outer diameter of the fixing portion 32 is smaller than the inner diameter of the groove wall 76.

As shown in FIG. 1, when the arm 30 is viewed in the specified plan, the two first portions 34 are in a two-fold symmetrical relationship with respect to the central axis C. Also, in the specified plan view of the arm, the two second portions 36 are in a two-fold symmetrical relationship with respect to the central axis C. In the following, the first portion 34 and the second portion 36 will be described with respect to one of the two first portions 34 and one of the two second portions 36.

As shown in FIGS. 1 and 2, the first portion 34 extends radially outward from an outer periphery of the fixing portion 32. The first portion 34 extends radially between the two adjacent cylinders 80. An end of the first portion 34 opposite the fixing portion 32 is situated in the fluid chamber 85.

As shown in FIG. 2, the second portion 36 is bilateral. That is, the second portion 36 has a base portion 36A and two extending portions 36B branching from the base portion 36A. The base portion 36A is connected to the end of the first portion 34 opposite the fixing portion 32. The two extending portions 36B extend circumferentially from the base portion 36A. Here, in the circumferential direction, the fluid chamber 85 is situated between the two cylinders 80. The circumferential ends of the fluid chamber 85 face the open end 80A of one of the two cylinders 80 and the closed end 80B of the other of the two cylinders 80. Each of the extending portions 36B extends toward the open end 80A as viewed from the fluid chamber 85.

The two extending portion 36B are spaced apart in the axial direction. Both of the two extending portions 36B are formed in a plate shape with a principal surface perpendicular to the central axis C. The two extending portions 36B each have a through hole 36H. Each through hole 36H penetrates the extending portion 36B in the axial direction.

<Piston>

The two pistons 50 have the same configuration. Therefore, one of the pistons 50 will be hereunder described.

As shown in FIG. 2, the piston 50 includes a piston body 52 and an attaching portion 54. The piston body 52 is cylindrical. The diameter of the piston body 52 is slightly smaller than the diameter of the cylinder 80. A seal ring Y1 is attached to the outer peripheral surface of the piston body 52. As shown in FIG. 1, the piston body 52 is disposed inside the cylinder 80. The seal ring Y1 seals the gap between the outer peripheral surface of the piston body 52 and the wall that defines the cylinder 80. One end surface of the piston body 52 forms a top surface 52A facing in the circumferential direction toward the closed end 80B of the cylinder 80. A plan view of the top surface 52A from the direction orthogonal to the plane of the top surface 52A is referred to as an orthogonal planar view. Since the piston body 52 is cylindrical, the top surface 52A is circular in the orthogonal plan view. The circular shape here does not include ellipses and the like. The shape is considered as circular if its circularity is 0.1 mm or less as defined in Japanese Industrial Standards "JIS B 0621".

As shown in FIG. 2, the attaching portion 54 is connected to the end surface of the piston body 52 opposite the top surface 52A. The attaching portion 54 has a rectangular shape. The dimensions of the sides of the attaching portion 54 are smaller than the diameter of the piston body 52. The mounting portion 54 has a through hole 54H. The through hole 54H penetrates the attaching portion 54 in the axial direction. The attaching portion 54 is inserted between the two extending portions 36B of the second portion 36 of the arm 30. A bolt P is inserted into the through hole 54H in the attaching portion 54 and the through holes 36H in the two extending portions 36B. The bolt P is held out by a nut N. The attaching portion 54 is rotatable with the bolt P as a fulcrum. The attaching portion 54 is thus connected to the second portion 36 via the bolt P. With the attaching portion 54 connected to the second portion 36, the piston 50 is connected to the output shaft 20 via the arm 30.

<Details of Connecting Points>

The bolt P, the through hole 54H in the piston 50, and the through hole 36H in the second portion 36 of the arm 30 correspond to a connection point between the piston 50 and the arm 30. The location of the connection point will now be described in detail. As shown in FIG. 1, when the integrated housing 70 is viewed in the specified plan, the middle one of three radially equally-divided regions of the top surface 52A of the piston 50 is referred to as a central region R. Also in the specified plan view of the integrated housing 70, a virtual line orthogonal to the top surface 52A and passing through the central region R is referred to as a reference virtual line. Here, there are innumerable virtual lines that correspond to the range of the central region R and fit the definition of the reference virtual line above. In the embodiment, one of the reference virtual lines that pass through the center of the top surface 52A in the radial direction is referred to as a main reference virtual line L for defining the location of the connection point. When the integrated housing 70 is viewed in the specified plan view, the above mentioned connection point is situated on the main reference virtual line L passing through the center of the top face 52A in the radial direction.

<Fluid Circuit>

As shown in FIG. 1, the actuator system 500 includes a fluid circuit 100. The fluid circuit 100 includes a feed passage 111, a drain passage 112, a first relay passage 121, a second relay passage 122, a first connecting passage 131, a second connecting passage 132, a first branch passage 141, and a second branch passage 142. The fluid circuit 100 further includes a tank 151, a pump 152, a check valve 153, a first switching valve 160, and a second switching valve 170.

The feed passage 111 connects the tank 151 and the first switching valve 160. The drain passage 112 connects the tank 151 and the first switching valve 160. The tank 151 stores hydraulic oil. The pump 152 is disposed on the feed passage 111. The pump 152 is electrically operated. The pump 152 pumps the hydraulic oil in the tank 151 to the downstream. The check valve 153 is disposed downstream of the pump 152 in the feed passage 111. The check valve 153 regulates the backflow of the hydraulic oil.

The first relay passage 121 connects the first switching valve 160 and the second switching valve 170. The second relay passage 122 also connects the first switching valve 160 and the second switching valve 170. The first relay passage 131 connects the second switching valve 170 and one of the two first feed and drain holes 91. The first branch passage 141 connects the middle of the first connecting passage 131 to the other of the two first feed and drain holes 91. The second connecting passage 132 connects the second switching valve 170 and one of the two second feed and drain holes 92. The second branch passage 142 connects the middle of the second connecting passage 132 to the other of the two second feed and drain holes 92.

The first switching valve 160 is a three-position, four-port valve. That is, the first switching valve 160 can be switched to the three positions: a connecting position 160A, a shut-off position 160B, and a reversing position 160C. When the first switching valve 160 is in the connecting position 160A, the first switching valve 160 connects the feed passage 111 to the first relay passage 121 and connects the drain passage 112 to the second relay passage 122. When the first switching valve 160 is in the reversing position 160C, the first switching valve 160 connects the feed passage 111 and the second relay passage 122, and connects the drain passage 112 and the first relay passage 121. When the first switching valve 160 is in the shut-off position 160B, the first switching valve 160 shuts off the flow between the feed passage 111 and the first relay passage 121 and between the drain passage 112 and the second relay passage 122.

The second switching valve 170 is a two-position, four-port valve. That is, the second switching valve 170 can be switched between two positions: a normal position 170A and a reducing position 170B. When the second switching valve 170 is in the normal position 170A, the second switching valve 170 connects the first relay passage 121 and the first communication passage 131 and connects the second relay passage 122 and the second connecting passage 132. When the second switching valve 170 is in the shut-off position 160B, the second switching valve 170 shuts off the flow between the first relay passage 121 and the first connecting passage 131 and between the second relay passage 122 and the second connecting passage 132. Moreover, the second switching valve 170 in the shut-off position 160B connects the first and second communication passages 131 and 132 through an orifice 170S. The orifice 170S is a passageway whose cross-sectional area is smaller than the other parts of the passage before and after the orifice 170S. In other words, the orifice 170S serves as a resistance to the flow of hydraulic fluid.

<Controller>

The actuator system 500 includes a controller 200 and a position sensor 45. The controller 200 may be formed as one or more processors that perform various processing in accordance with a computer program (software), or one or more dedicated hardware circuits such as application-specific integrated circuits (ASICs) that perform at least a part of the various processing, or a circuitry including a combination thereof. The processors include a CPU and a memory such as a RAM or ROM. The memory stores program codes or instructions configured to cause the CPU to perform processes. The memory, or a computer-readable medium, encompasses any kind of available medium accessible to a general-purpose or dedicated computer.

The controller 200 repeatedly receives detection signals from the position sensor 45 that detects the rotational position of the output shaft 20. The controller 200 also repeatedly receives signals from the higher-level device 300 installed in the aircraft. The controller 200 controls the fluid circuit 100 based on various information received. Specifically, the controller 200 controls the pump 152, the first switching valve 160, and the second switching valve 170 based on outputs of control signals.

The controller 200 can control the fluid circuit 100, for example, in two control modes. In the first mode, the second switching valve 170 is controlled to be in the normal position 170A with the pump 152 driven and the first switching valve 160 is switched to the connecting position 160A or the reversing position 160C. In the second mode, the second switching valve 170 is controlled to be in the reducing position 170B with the pump 152 stopped and the first switching valve 160 is controlled to be in the shut-off position 160B.

<Operation in Embodiment>

Assume now that the controller 200 is controlling the fluid circuit 100 in the first mode. It is further assumed that the controller 200 controls the first switching valve 160 to be in the connecting position 160A. In this case, the feed passage 111 is connected to the first connecting passage 131 and the first branch passage 141 via the first relay passage 121. Thus, the hydraulic fluid pumped from the tank 151 to the feed passage 111 is supplied between the seal members 40 and the top surfaces 52A of the pistons 50 in the two cylinders 80 through the first feed and drain holes 91. In each cylinder 80, the hydraulic pressure of the hydraulic fluid supplied to the cylinder 80 acts on the top surface 52A of the piston 50. The hydraulic fluid pushes the top surface 52A of the piston 50 in the circumferential direction from the closed end 80B side toward the open end 80A side in the cylinder 80. Here, when the first switching valve 160 is in the connecting position 160A, the drain passage 112 communicates with the second connecting passage 132 and the second branch passage 142 through the second relay passage 122. At this time, the hydraulic fluid that previously flowed into the two fluid chambers 85 is drained from the fluid chambers 85 through the second feed and drain holes 92 into the drain passage 112. As a result of the feed and drain of the hydraulic oil through these first and second feed and drain holes 91 and 92, a greater hydraulic pressure acts on the top surface 52A side than the mounting portion 54 side of the piston body 52. Due to this difference in the hydraulic pressure, the piston 50 is moved in the cylinder 80 toward the open end 80A. Consequently, the output shaft 20 rotates clockwise in FIG. 1.

From this state, when the controller 200 switches the first switching valve 160 to the reversing position 160C, the feed passage 111 is communicated to the second connecting passage 132 and the second branch passage 142 via the second relay passage 122. In this case, the hydraulic fluid pumped from the tank 151 to the feed passage 111 is supplied to the two fluid chambers 85 through the second feed and drain holes 92. While the drain passage 112 is connected to the first connecting passage 131 and the first branch passage 141 through the first relay passage 121. The hydraulic fluid disposed between the seal member 40 and the piston 50 in the two cylinders 80 is discharged into the drain passage 112 through the first feed and drain holes 91. This results in a hydraulic pressure difference between the attaching portion 54 side and the top surface 52A side of the piston body 52, and the piston 50 is moved in each cylinder 80 toward the closed end 80B by the hydraulic pressure difference. Consequently, the output shaft 20 rotates counterclockwise in FIG. 1.

As described above, in the first mode, the piston 50 reciprocates inside the corresponding cylinder 80 in response to switching of the first switching valve 160 between the connecting position 160A and the reversing position 160C by the controller. Consequently, the output shaft 20 also reciprocates.

When the fluid circuit 100 is controlled in this first mode, the controller 200 may switch the control mode to the second mode in response to a command from the higher-level device 300, for example. When the control unit 200 switches the control mode to the second mode, the first connecting passage 131 and the second connecting passage 132 are connected. In other words, in the second mode, the paired cylinder 80 and the fluid chamber 85 are connected. In this case, the hydraulic oil moves back and forth between the paired cylinder 80 and the fluid chamber 85 in conjunction with the piston 50 reciprocating inertially, following its previous motion. When the hydraulic fluid reciprocates, it passes through orifice 170S. As the hydraulic fluid passes through the orifice 170S, the momentum of the hydraulic fluid flow is gradually decreased. Accordingly, the amount of movement of the piston 50, and thus the amount of rotation of the output shaft 20, is gradually reduced.

Advantageous Effects of Embodiment (1) As described above, when the hydraulic fluid is supplied to the cylinder 80 through the first feed and drain hole 91, the hydraulic fluid pushes the top surface 52A of the piston 50 toward the open end 80A of the cylinder 80. At this time, the force on the reference imaginary line L acts on the top surface 52A as viewed a whole. In the embodiment, the connection point between the piston 50 and the arm 30 is disposed on the extension of the central region R of the top surface 52A of the piston 50. Since the connection point is on the extension of the central region R, it is possible to minimize the difference in the direction of the force acting on the top surface 52A and the direction of the force working to rotate the arm 30 at the connection point. As a result, when the hydraulic pressure acts on the top surface 52A of the piston 50, the force is efficiently transmitted from the piston 50 to the arm 30 as a force making the arm 30 and output shaft 20 rotate. In addition, the force that pushes the piston 50 radially outward in the cylinder 80 is reduced. Therefore, the friction between the piston 50 and the walls that define the cylinder 80 can be reduced. The reduced friction enables the arm 30 and output shaft 20 to rotate efficiently.

(2) Regarding (1) discussed above, in the embodiment, the connection point is disposed on the reference virtual line L passing through the radial center of the top surface 52A of the piston 50. This allows the force of the hydraulic fluid acting on the top surface 52A of the piston 50 to be transmitted to the arm 30 very efficiently. Therefore, the embodiment is particularly appropriate for enjoying the advantageous effect of (1).

(3) In the embodiment, the arm 30 is Z-shaped in the specified plan view. In other words, the arm 30 has the shape that extends from the output shaft 20 to the piston 50 but avoids the cylinder 80. By adopting such a shape that avoids the cylinder 80, the arm 30 can be connected to the piston 50 without reducing the circumferential length of the cylinder 80. Therefore, the cylinder 80 can be made sufficiently long, which allows the piston 50 to have a sufficient range of motion. Moreover, because of the shape that avoids the cylinder 80, there are no restrictions on the dimensions of the second portion 36 in securing a sufficient length of the cylinder 80 as mentioned above. Therefore, the length of the second portion 36 can be increased and the length of the piston 50 can be shortened by that amount. Downsizing of the piston 50 facilitates surface machining of the piston 50, such as polishing to reduce friction, for example.

(4) In the embodiment, the top surface 52A of the piston 50 has a circular shape. In other words, the piston body 52 is cylindrical. As discussed in (3) above, the size of the piston 50 of the embodiment can be reduced. That is, in the embodiment, the piston body 52 has a small cylindrical shape. Cylindrical shapes are easy to manufacture and particularly easy to surface-machine.

Modification Examples

The foregoing embodiment can be modified as described below. The above embodiment and the following modifications can be implemented in combination to the extent where they are technically consistent to each other.

A set of the first portion 34 and the second portion 36 of the arm 30 is referred to as a body portion. In the rotary actuator 10, the number of the pistons 50, the number of the body portions in the arm 30, and the number of cylinders 80 are not limited to the examples in the above embodiment. For example, the rotary actuator 10 may be configured to have only one piston 50 and only one body portion in the arm 30. Further, one cylinder 80 and one fluid chamber 85 are defined in the integrated housing 70, and one first feed and drain hole 91 and one second feed and drain hole 92 are provided. For example, in such a configuration where the body portion is provided on only one side of the arm 30 and only one each component such as a piston 50 is provided, the diameter of the cylinder 80 can be increased and the diameter of the piston body 52 can be increased accordingly. The area of the top surface 52A of the piston body 52 can be increased in proportion to the square of the diameter of the piston body 52. Thus, the force to rotate the arm 30 and output shaft 20 can be increased for the same hydraulic pressure. Consequently, the output of the rotary actuator 10 can be increased.

As described in the above embodiment, there are innumerable reference imaginary lines that fit the definition of being orthogonal to the top surface 52A of the piston 50 and pass through the central region R. Any of these innumerable reference imaginary lines may be treated as the reference imaginary line L for defining the position of the connection point between the piston 50 and the arm 30. In other words, any one of the innumerable reference imaginary lines above should pass through the connection point between the piston 50 and the arm 30.

The shape of the top surface 52A of the piston 50 is not limited to that of the above embodiment. The shape of the piston body 52 may change depending on the shape of the top surface 52A of the piston 50. • The configuration of the attaching portion 54 of the piston 50 is not limited to the example of the embodiment. The attaching portion 54 may be configured in any way provided that the piston body 52 can be connected to the arm 30.

The means of fixing the fixing portion 32 of the arm 30 to the output shaft 20 is not limited to the example of the above embodiment using a spline connection. As long as the fixing portion 32 can be fixed to the output shaft 20, any means are can be used.

The fixing portion 32 may be omitted from the arm 30. In this case, the first portion 34 of the arm 30 may be directly fixed to the output shaft 20. • The configuration of the first portion 34 and second portion 36 of the arm 30 is not limited to the example of the above embodiment. The arm 30 can be configured in any way provided that it can connect the output shaft 20 and the piston 50. Depending on the application of the rotary actuator 10, the required range of reciprocating motion of the output shaft 20 may be relatively small. In such cases, for example, the circumferential length of the cylinder 80 may be shortened. If it is possible to shorten the length of the cylinder 80, the second portion 36 may be eliminated and the first portion 34, which extends radially straight from the output shaft 20, may be directly connected to the piston 50. In this case, the tip of the first portion 34 can be configured connectible to the piston 50.

The means of connecting the arm 30 and the piston 50 is not limited to the example of the above embodiment, such as the bolts P. Any means can be used to connect the arm 30 and the piston 50 provided that it can transmit the force acting on the piston 50 as the force that rotates the arm 30.

The configuration of the cylinder 80 is not limited to the example of the above embodiment. For example, the circumferential length of the cylinder 80 may be changed from the example of the above embodiment. The cylinder 80 can be formed in any configuration provided that it extends in a circular arc around the output shaft 20.

The configuration of the integrated housing 70 is not limited to the example of the above embodiment. For example, the external size of the first housing 70A may be different from that of the second housing 70B. For example, the peripheral wall 72 may be formed in a rectangular shape. The integrated housing 70 may be formed in any configuration provided that the cylinder 80 is defined therein and the piston 50 can move inside the cylinder by the action of the pressure medium.

The configuration of the fluid circuit 100 is not limited to the example of the above embodiment. The fluid circuit 100 can be formed in any configuration provided that it makes the piston 50 operate as required. For example, the first branch passage 141 and the second branch passage 142 may be eliminated, and the first switching valve 160 and the second switching valve 170 may be provided for each pair of the cylinder 80 and fluid chamber 85. How the fluid circuit 100 is controlled may change as the configuration of the fluid circuit 100 is changed.

The pressure medium fed to and drained from the cylinder 80 is not limited to the example of the above embodiment. Alternatively, the pressure medium may be, for example, air. The object to be operated by the actuator system 500 is not limited to the example of the above embodiment. The object may be any mounted object of an aircraft other than a flight control surface.

The actuator system 500 may be applied to any objects other than aircrafts. Such an object to which the actuator system is applied may be a ship, for example. The foregoing embodiments describe a plurality of physically separate constituent parts. They may be combined into a single part, and any one of them may be divided into a plurality of physically separate constituent parts. In either case, the members or the like are acceptable as long as they are configured to attain the object of the disclosure.

According to the foregoing embodiments, a plurality of functions are distributively provided. Some or all of the functions may be integrated. Any one of the functions may be partly or entirely segmented into a plurality of functions, which are distributively provided. Regardless of whether or not the functions are integrated or distributively provided, they are acceptable as long as they are configured to attain the object of the disclosure.

What is claimed is:

1. A rotary actuator, comprising:

an output shaft;

a housing in which a cylinder is defined, the cylinder having a circular arc shape around the output shaft;

a piston adapted to move inside the cylinder by action of a pressure medium; and an arm connecting the piston and the output shaft, wherein the piston has a through hole that penetrates the piston in an axial direction of the output shaft, wherein the arm has a through hole that penetrates the arm in the axial direction of the output shaft, wherein the piston is connected to the arm by a bolt inserted into the through hole in the piston and the through hole in the arm so that the piston is rotatable with the bolt as a fulcrum, wherein, when viewed in plan from a direction parallel to the output shaft, a top surface of the piston has three equally divided regions divided in a radial direction from a center of the output shaft, a middle one of the three regions being a central region, and wherein, when viewed in plan from the direction parallel to the output shaft, a connection point between the piston and the arm is situated on a virtual line that is orthogonal to the top surface and passes through the central region.

2. The rotary actuator of claim 1, wherein, when viewed in plan from the direction parallel to the output shaft, the virtual line passes through a center of the top surface in the radial direction.

3. The rotary actuator of claim 1, wherein the cylinder is one of a plurality of the cylinders arranged spaced apart from each other in a circumferential direction around the output shaft, wherein the arm includes:

a first portion extending between two adjacent cylinders of the plurality of cylinders in the radial direction; and a second portion extending from said first portion in the circumferential direction and connected to the piston.

4. The rotary actuator of claim 3, wherein the top surface is circular when viewed in plan from a direction orthogonal to the top surface.

5. The rotary actuator of claim 1, wherein the connection point between the piston and the arm includes the bolt.

6. The rotary actuator of claim 5, wherein the bolt extends in a direction that is parallel to the axial direction of the output shaft.

* * * * *